United States Patent [19]

Hansen

[11] 4,328,586
[45] May 4, 1982

[54] OPTICALLY COUPLED SERIAL COMMUNICATION BUS

[75] Inventor: Paul L. Hansen, Brea, Calif.

[73] Assignee: Beckman Instruments, Inc., Fullerton, Calif.

[21] Appl. No.: 98,100

[22] Filed: Nov. 28, 1979

[51] Int. Cl.³ .......................................... H04L 25/00
[52] U.S. Cl. ...................................... 375/36; 370/85; 370/32; 371/57; 371/67; 340/825.62; 340/870.11
[58] Field of Search ....................... 370/32, 85, 86, 87, 370/89, 90; 371/57, 67; 375/7, 36, 8; 455/58, 73, 78, 602; 364/200; 333/15; 340/147 R, 167 R, 172, 182, 184, 188 R, 507, 508, 295

[56] References Cited

U.S. PATENT DOCUMENTS

| | | | |
|---|---|---|---|
| 2,577,751 | 12/1951 | Halstead | 455/58 |
| 2,731,622 | 1/1956 | Doremus et al. | 455/58 |
| 3,340,363 | 9/1967 | Bour et al. | 340/172 |
| 3,345,610 | 10/1967 | Wolf | 371/59 |
| 3,420,993 | 1/1969 | Chamberlain et al. | 340/172 |
| 3,448,443 | 6/1969 | Weld | 340/295 |
| 3,469,191 | 9/1969 | Russell, Jr. et al. | 455/116 |
| 3,543,236 | 11/1970 | Sibley | 371/57 |
| 3,962,646 | 6/1976 | Tempka | 371/57 |
| 4,013,959 | 3/1977 | Patterson | 455/58 |
| 4,087,677 | 5/1978 | Dunn et al. | 455/602 |
| 4,199,663 | 4/1980 | Herzog | 370/85 |
| 4,262,357 | 4/1981 | Shima | 370/85 |

Primary Examiner—Benedict V. Safourek
Attorney, Agent, or Firm—R. J. Steinmeyer; P. R. Harder; Edward C. Jason

[57] ABSTRACT

A master slave controller communication system is disclosed wherein intercommunication occurs between a master controller and a slave controller over the same communication control line. The communication control line contains three busses. At least one bus is a forward/reverse bus and a second bus is a power bus.

25 Claims, 6 Drawing Figures

OPTICALLY COUPLED SERIAL COMMUNICATION BUS

BACKGROUND OF THE INVENTION

The present invention relates to a method and apparatus for communication transmission between a master controller and a slave controller and more particularly to methods of intercommunication over a single communication line. The present invention also more particularly relates to methods and apparatus for preventing communication line blockage by a faulty slave controller, faulty information reception due to simultaneous slave controller transmission and due to simultaneous master controller reception and transmission.

Prior art has been faced with the problem of operating system devices at a point remote from the main control such as, environmental control systems, chemical process lines, etc. Previously, the inputs from process sensing elements, such as flow meters, pressure transducers or the like, and the outputs to the control elements, such as valves, motors or the like, were connected to closely coupled process peripheral devices comprising analog-to-digital and digital-to-analog converters. This resulted in long analog signal wiring and an increased load on the controller not only to perform the functions of the supervisory loop but also to monitor the secondary loop dynamic requirements such as tuning coefficients, scaling parameters, etc.

The contemporary solution provided by prior art to this problem is to provide a central controller, sometimes referred to as a master or host controller and slave controllers or central processing units locatd at a point in near proximity to the devices to be operated. Communications from the master controller to the multiple slave processors has been intensified during the past decade by the introduction of the microprocessor. The microprocesor allowed the secondary loop dynamic requirements to be removed from the master or host processor and distributed toward the control element. This distributed controller or slave controller contains the required analog-to-digital and digital-to-analog converter facility as well as the means of communicating with the master controller. The means of accomplishing this communication is typically referred to as a data bus or data highway over which information usually digitally encoded in a bit serial format is transmitted between the master controller and the slave controller. The master/slave dialog requires a half duplex mode of operation as the slaves speak only when spoken to by the master.

Prior art buses have been implemented by various base band types of integrated circuit driver/receiver elements to support such line specifications as EIA RS232C, or EIA RS422. Such drivers require a common ground reference from slave controller to slave controller the full length of the bus. Even the use of differentially coupled driver/receivers such as those supporting the RS422are limited to common mode ground noise levels of less than 10 to 20 volts. For this type of system, a single hose or master controller can only support 20 or 30 slave stations distributed over only distances of 1,000 feet.

The relatively low comon mode voltage and short bus length of prior art does not meet the needs of a distributed system in a current industrial environment. An additional problem of prior art is concerned with the faiure of one of the slave controllers. Typically, information exchanged between the master and slave controllers is in digital format over a single line for all slave controllers. Digital format consists of high and low signals, their sequential configuration determining the character transmitted. If the slave fails in the high mode, transmission between master controller and other slave controllers may be blocked when communication is over the same transmission line for a multiple of slave controllers. Thus, the communication between slaves and master is blocked in the high position preventing all communication between the master and the slaves.

Additional problems of the prior art master slave communication systems is concerned with the simultaneous communication from multiple slave controllers to the master controller, which garbles the information received by the master controller. Simultaneous communication errors may be similar to those caused by electrical noise.

It is therefore an object of the present invention to provide an inexpensive communication system between a master controller and multiple slave controllers in a multidrop configuration that is inherently immune from all forms of electrical noise.

It is also an object to provide a system which permits master and slave communications on a minimum number of control wires.

It is a further object to provide a system which prevents simultaneous mater and slave communications.

It is also a further object to provide a system which detects simultaneous communication of more than one slave.

It is another object to provide a system which will prevent a faulty slave controller from blocking information transmission.

SUMMARY OF THE INVENTION

The present invention overcomes the cost related with multiple transmission lines, one for master to slave communications and another for slave to master communications or one communication line for each slave controller by providing one level of character configuration for communications from the master controller to the slave controller and a second level, based upon other circuit parameters, for communications from a slave controller to the master controller.Thus, the same control line can be used for both master and slave transmissions and the need for separate communiction lines for master to slave and slave to master transmissions is eliminated. By time multiplexing the slave controller inputs, parallel lines for each slave controller communication are eliminated. Compatible circuitry is provided to permit usage of the same line while isolating the ground connection for a master controller and for a slave controller.

A circuit is provided to detect simultaneous transmission from more than one slave controller and indicate such to the master controller while preventing the acceptance of erroneous data by the master controller from the slave controllers. Thus, simultaneous transmission from slave controllers is eliminated without the need of a complex and expensive line multiplexing circuit and associated synchronizing circuitry.

Simultaneous master and slave transmitting is prevented by a circuit which senses transmission from the slave controller and prevents host transmission while the slave transmission is present.

An additional circuit is provided which monitors the transmisson of information from the slave controller and is capable of sensing continuous high level signal which would normally block all communications between master and slave controllers. The circuit, upon transmission of a continuous high signal by the slave controller, will produce a signal which will disconnect the slave controller from the transmission line. Thus, the problem of one slave controller completely typing up communication lines between the master controller and the slave controllers is eliminated.

Additional applications and further advantages will be recognized by those skilled in the art in light of the following detailed description of a preferred embodiment of this invention.

DESCRIPTION OF THE PREFERRED EMBODIMENT

Figure 1:
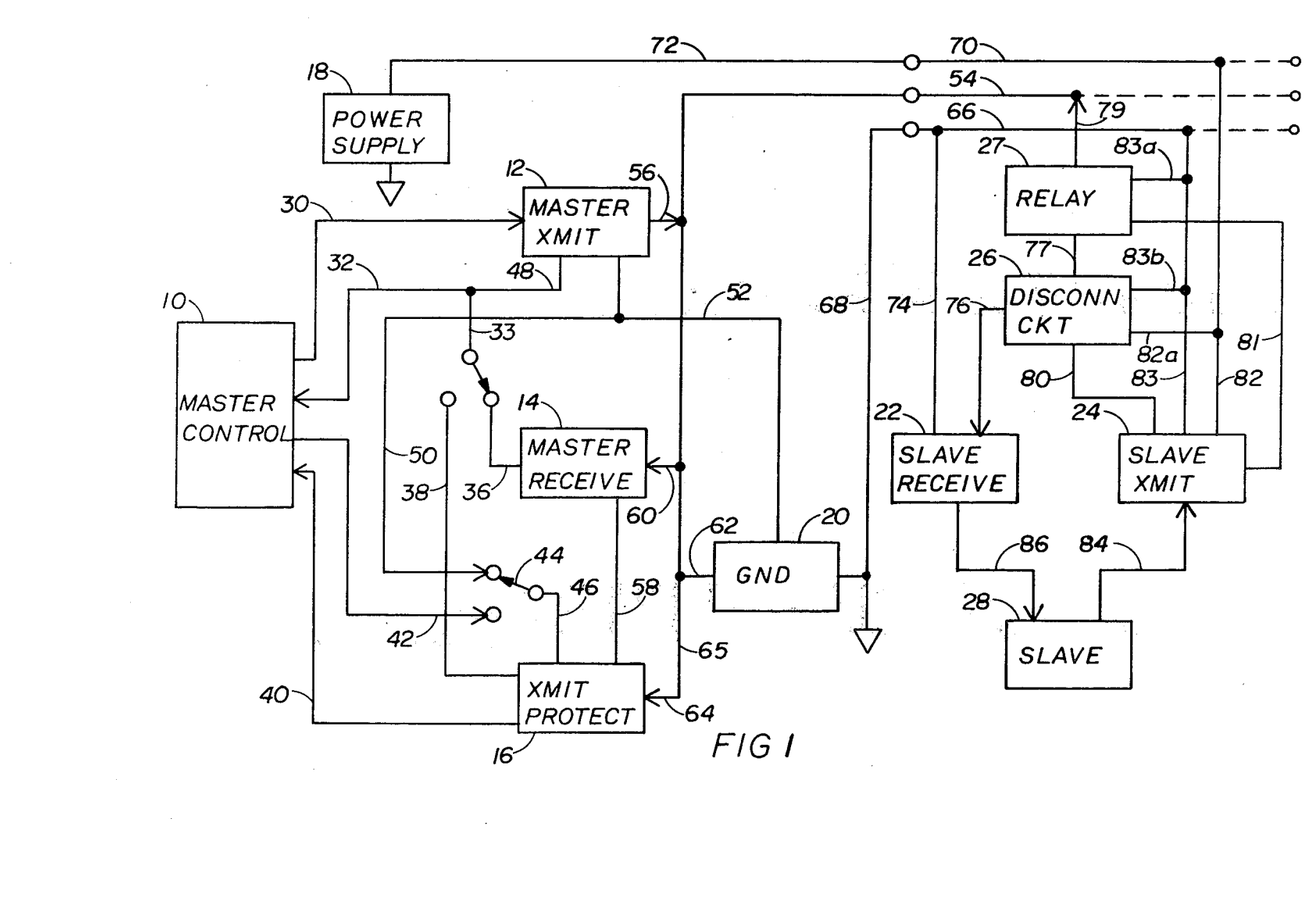
FIG. 1 is a block diagram illustrating a master controller with one slave controller.

FIG. 1 illustrates a master slave communication network embodying the present invention having a master controller 10, a master transmitter 12, a master receiver 14, dual slave transmission protection circuit 16, power supply 18, ground circuit 20, slave receiver 22, slave transmitter 24, disconnect circuit 26, relay 27 and slave controller 28. Master controller 10 is connected to master transmitter 12 through conductor 30, to master receiver 14 through conductor 32 at node 33 when switch 34 is connected to conductor 36 and to dual slave transmission protection circuit 16 when switch 34 is connected to conductor 38. Master controller 10 is also connected to dual slave transmission protection circuit 16 through conductor 40 and through conductor 42 when switch 44 connects conductor 42 to conductor 46.

Master transmitter 12 is connected to master receiver 14 through conductor 48 when switch 34 is connected to conductor 36 and to dual slave transmission protection circuit 16 when switch 34 is connected to conductor 38 or when switch 44 connects conductor 50 to conductor 46. Master transmitter 12 is also connected to ground circuit 20 throgh conductor 52 and to forward reverse bus 54 through conductor 56. Finally, master transmitter 12 is connected to the negative terminal of a negative power supply indicated generally by the designation −12 V in FIG. 2, the remaining terminal of the negative power supply being connected to the system ground.

Master receiver 14 is connected to one terminal of switch 34 through conductor 36 and to dual slave transmission protection circuit 16 through conductor 58. Master receiver 14 is connected to forward reverse bus 54 through conductor 60 which is connected to conductor 65 and to ground circuit 20 through conductor 62 which is also connected to conductor 65. Dual slave transmission protection circuit 16 is connected to master receiver 14 through conductor 58, to switch 44 through conductor 46, to switch 34 through conductor 38, to master controller 10 through conductor 40, to ground circuit 20 through conductor 64, which is connected to conductor 65 and to forward reverse bus 54 through conductor 65. Round circuit 20 is connected to ground bus 66 through conductor 68. The positive terminal of the positive power supply 18 is connected to power bus 70 through conductor 72, the remaining terminal of the positive power supply being connected to the system ground. The system ground is connected to ground bus.

Slave receiver 22 is connected to ground bus 66 through conductor 74, and to disconnect circuit 26 through conductor 76 which connects to conductor 75. Disconnect circuit 26 is connected to relay 27 through conductor 77 and to conductor 82 which connects to power bus 70 through conductor 82a. Relay 27 is connected to forward/reverse bus 54 through conductor 79, to ground bus 66 through conductor 83a, to slave transmitter 24 through conductor 81 and to disconnect circuit 26 through conductor 77. Slave transmitter 24 is connected to disconnect circuit 26 through conductor 80, to relay 27 through conductor 81, to power bus 70 through conductor 82 and to slave controller 28 through conductor 84. Slave controller 28 is connected to slave receiver 82 through conductor 86.

The basis of operation of the system is that one master controller is programmed to provide the intelligence (i.e. can initiate communication) for an entire system consisting of a plurality of localized less intelligent (i.e. cannot initiate communication) slave controllers. Master communication is based upon one circuit parameter, such as voltage, while slave communication is based upon a second circuit parameter, such as curent. Although the slave controllers are individually initiated through a binary coded address system, different parameter based communications completely prevents a slave controller from erroneously responding to another slave controller's information transmission to the master controller.

The slave controllers perform a variety of functions, such as valve opening or closing, temperature sensing, etc. The master controller obtains information from the slave controller and issues directions to the slaves depending upon the received information and its programmed directives. The master controller is provided with circuitry to prevent transmission of directions while information is being received from a slave controller. Additional circuitry is provided to detect information transmitted simultaneously from more than one slave controller. This circuitry may detect simultaneous transmission by more than one slave and informs the master controller by either a single status line or a specially generated character.

Each slave controller contains circuitry to prevent transmission line blockage when a slave controller fails. Communication between master and slave controllers is in digital format, a series of high and low pulses. When a slave controller fails in the high mode during information transmission, the transmission line carries a continuous high signal and no further transmission is possible. Circuitry associated with each slave controller detects this condition and disconnects the slave controller from the transmission line. Thus, an information stopping continuous high signal is taken off the line automatically and can only be returned to service manually when the slave unit has been repaired.

In operation, master controller 10 issues digital signals to be conveyed to slave controller 28 through conductor 30 to master transmitter 12. In the preferred embodiment described, the digital signals are pulses ranging from minus three volts for a low and plus three voltage for a high. However, as recognized by one skilled in the art, digital signals from master controller 10 may vary in presently available controllers and the important facet is that two distinct signal voltage levels are utilized. Master transmitter 12 receives the ±3 volt signals from master controller 10 and converts them to voltage pulses which preferably range from −12 volts to 0 volts for transmission over forward reverse bus 54. As one skilled in the art will quickly recognize, any easily transmitted digital signals may be used. The essential characteristic is that the signals transmitted by master transmitter 12 have one polarity with respect to the system ground, while those transmitted by slave transmitter 24 have the opposite polarity with respect to the system ground, as will be discussed in detail in conjunction with FIG. 4.

Master transmitter 12 also receives a signal from master receiver 14 or dual slave transmission protection circuit 16 as to whether or not slave controller 28 is transmitting information to master controller 10. If master receiver 14 is receiving information from slave controller 28, transmission of information from master controller 10 through master transmitter 12 is prevented by a signal received through conductor 48. When transmission is not prevented, master transmitter 12 issues the information signals to forward reverse bus 54 through conductor 56. Slave receiver 22 will receive the signals from forward reverse bus 54 through slave transmitter 24 which is connected to forward reverse bus 54 through relay 27. When more than one slave controller is being operated by master controller 10, the initial information transmitted is the binary code identification to select the individual controller which is to respond to the information from the master controller 10. The information received by slave receiver 22 is then converted to controller signal levels and conveyed to slave controller 28 through conductor 86. In the preferred embodiment, slave controller level signals are approximately minus three volts for a low and plus three volts for a high. However, as with master controller 10, controller level signals for slave controller 28 may be of any suitable level. If information is required of slave controller 28 in response to the information conveyed to it by master controller 10, this information will be conveyed to slave transmitter 24 through conductor 84. In the preferred embodiment, slave receiver 22 and slave transmitter 24 are each connected to slave controller 28 through photocouplers. (See FIGS. 2 and 4.) Photocoupler connections electrically isolate the ground of master controller 10 (i.e., the master or system ground) from the ground of slave controller 28 (i.e., the slave or station ground). Photocouplers are used since the ground voltage levels present at different stations may differ from each other when employing a plurality of slave controllers distributed over a large area.

Slave transmitter 24 converts the binary coded information to preferably current pulses of about sixty milliamps. Current based pulses of digital information are utilized for reverse transmission, that is from salve controller 28 to master controller 10, to facilitate detection of simultaneous slave transmission by current summing in dual slave transmission protection circuit 16. The slave transmitter conveys the information to disconnect circuit 26 through conductor 80. Disconnect circuit 26 will determine whether slave controller 28 has failed in the high mode while conveying digital information to master receiver 14 and control relay 27 based upon this determination. When information is being conveyed, slave transmitter 24 transmits the information to forward reverse bus 54 through relay 27. Relay 27 disconnects slave transmitter 24 from forward reverse bus 54 whenever slave transmitter 24 fails in the high mode, as determined by disconnect circuit 26. The information is received by master receiver 14 through conductor 60, by means of the voltages that are produced by the 60 milliamp current pulses as the latter flow through ground circuit 20.

Master transmitter 12 does not respond to the information transmitted by slave transmitter 24 through conductor 56 due to the construction of the transmission circuitry which will be described in greater detail in conjunction with FIG. 2. Master receiver 14 converts the voltage levels produced by the current pulses from slave transmitter 24 to digital controller level voltage pulses (plus 3 volts to minus 3 volts) and feeds this information to master controller 10 as described in greater detail in conjunction with FIG. 4.

If two or more slave controllers are responding to the transmitted information of master controller 10, dual slave transmission protection circuit 16 will prevent receipt of this dual information by master controller 10, as will be described in detail in connection with FIG. 6.

The master/slave controller system of FIG. 1 has been reduced to a master controller and a single slave controller for simplicity. However, it is to be understood that the particular system illustrated is suitable for as many as 60 slave controllers. It is also important to note that the transmission from master to slave is done by digital information having a low signal of approximately −12 volts and a high signal of approximately zero volts, these signal levels being derived from the negative (−12 V) power supply. The transmission from slave controller to master controller is done by current pulses 0 to 60 ma, these signal levels being derived from the positive (+12 V) power supply 18. Thus, the forward transmission, from master to slave, is easily distinguished from reverse transmission, from slave to master. For any space of time it is easily determined whether the master controller is talking to a slave controller or the slave controller is talking to the master controller. Furthermore, by maintaining this difference between the forward and reverse transmission, connections between the master controller and the slave controller can be accomplished with a three-wire bus (i.e. a power line, an information transmission line, and a ground line). For a system having 60 slave controllers distributed over a 5,000 foot line, the present invention prefers three No. 18 wires twisted with foil shield to permit communication at the rate of 9,600 baud (bits/second). It is apparent to one skilled in the art, however, that smaller sized conductors for the three wire bus are possible if fewer slave couplers were to be used, if the distribution line is less than 5,000 feet, or if communication rate less than 9,600 baud is desired. Any 12 V power supply with short circuit protection is suitable for operation of the preferred embodiment. The preferred embodiment described has particular useful application in environmental control systems where the temperature, humidity and the like are to be controlled for specific areas of a very large office building. However, one skilled in the art can find additional applications for the communication system between the master controller and a slave controller taught by the present invention.

Figure 2:
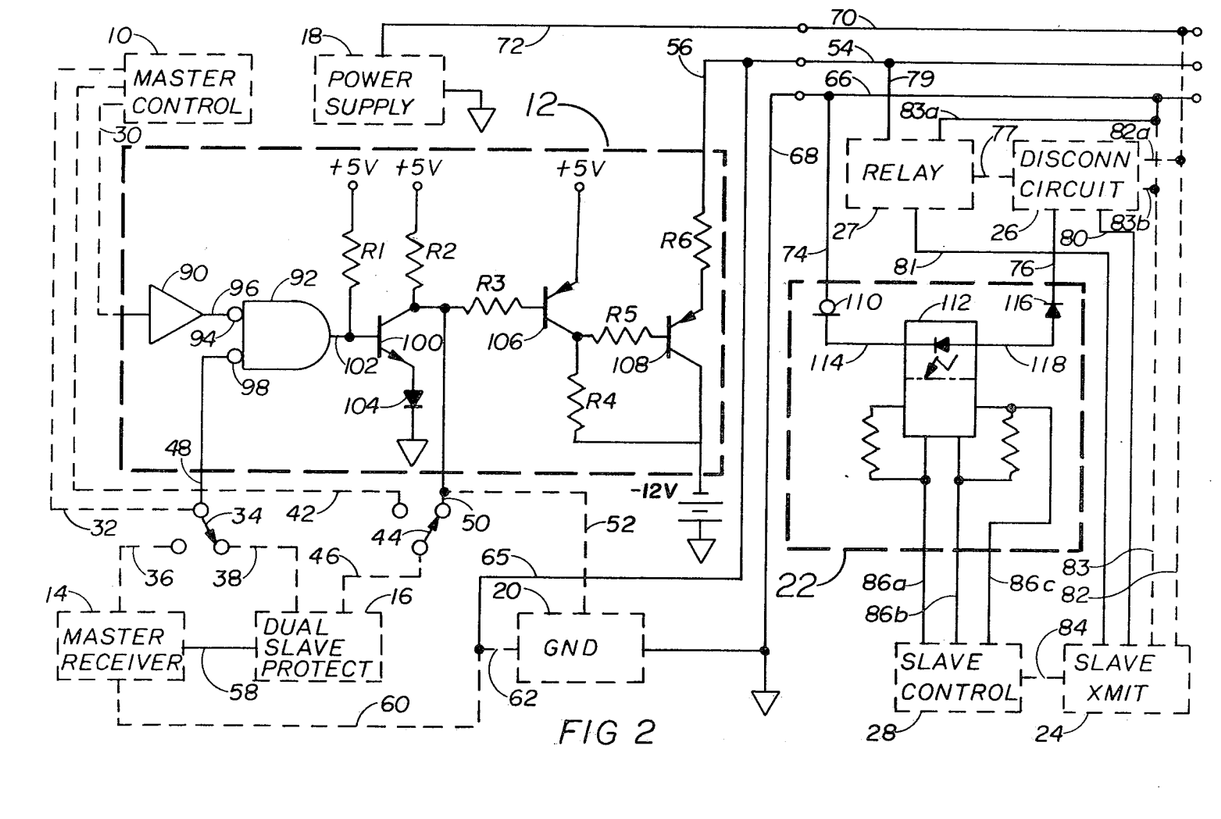
FIG. 2 is a schematic diagram of the master transmitter and slave receiver of FIG. 1.

Referring now to FIG. 2, master transmitter 12 and slave receiver 22 along with power bus 70, forward reverse bus 54 and ground bus 66 are illustrated in schematic form. Other system components, such as power supply 18, ground circuit 20, master receiver 14, master controller 10, dual slave transmission protection circuit 16, disconnect circuit 26, relay 27, and associated connections are shown in phantom form for reference since they are not essential to the illustrated circuit function but necessary for proper operation of the overall system.

Master transmitter 12 is illustrated as having a level converter 90 connected to master controller 10 through conductor 30 on its input side and connected to AND gate 92 through inverter 94 by conductor 96 on its output side. AND gate 92 also receives an input through inverter 98 from master receiver 14 or dual slave protection circuit 16 through conductor 48. The output of AND gate 92 is connected to the base of transistor 100 through conductor 102. Conductor 102 also connects to a positive five volts power supply through a current limiting resistor R1. The emitter of transistor 100 is connected to ground through diode 104. Diode 104 provides an increased base emitter voltage to ensure turn off of transistor 100. The collector of transistor 100 is connected to a positive five volts power supply through resistor R2, to the base of transistor 106 through resistor R3, to ground circuit 20 through conductor 52 and to switch 44 through conductor 50. The purpose of resistor R3 is to provide base drive for saturating transistor 106. The emitter of transistor 106 is connected directly to a plus five volts power supply and the collector of transistor 106 is connected to a minus twelve volts power supply through current limiting resistor R4 and to the base of transistor 108 through resistor R5. The purpose of resistor R5 is to control base current to saturate transistor 108.

The emitter of transistor 108 is connected to a minus twelve volts power supply and the collector is connected to forward reverse bus 54 through current limiting resistor R6 by conductor 56. The path for current flow through transistor 108 and the negative power supply is completed through ground bus 66, slave receiver 22 and bus 54, as will be explained later in connection with slave receiver 22.

Conductor 56 is connected to conductor 65 which connects conductor 62 of ground circuit 20 to forward reverse bus 54. Thus the collector of transistor 108 and the drain of VMOS transistor 120 (see FIG. 3) are connected in parallel through conductors 56 and 65.

Slave receiver 22 is illustrated as having a constant current diode 110 connected to ground bus 66 through conductor 74 at its anode and photocoupler 112 through conductor 114 at its cathode. Photocoupler 112 is connected to the anode of diode 116 through conductor 118. The cathode of diode 116 is connected to disconnect circuit 26 through conductor 76.

Photocoupler 112 provides electrical isolation between master controller 10 and slave controller 28. The optical coupler allows proper data transmission with voltage differences between the master controller and slave controller signal references of as much as 300 volts.

In operation master transmitter 12 receives master transmit signals from master controller 10 through conductor 30 to level converter 90. Level converter 90 converts the master controller signal levels, which are approximately ±3 volts to the transmission tie line level of approximately zero volts for a low and positive 0.7 volts for a high. Level converter 90 may be of any type commonly known in the art. However, an EIA RS232C receiver is preferred. Level converter 90 feeds its output through conductor 96 to inverter 94. Inverter 94 logically inverts the output of level converter 90 and supplies one of the inputs to AND gate 92. AND gate 92 also receives an input from inverter 98, which receives an input from master receiver 14 or dual slave transmission protection circuit 16 through conductor 48. AND gate 92 of master transmitter 12 through conductor 48 receives an indication of whether a slave is transmitting information from master receiver 14 or dual slave transmission protection circuit 16. When slave controller 28 is transmitting information a true or high signal occurs at master receiver 14 during information reception and is transmitted to inverter 98 through conductor 48 when switch 34 is connected to conductor 36. When switch 34 is connected to conductor 38, the output of master receiver 14 is channeled through dual slave transmission protection circuit 16 through conductor 58 and appears on conductor 38 to be conveyed to inverter 98 through conductor 48 by switch 34. (See FIG. 4.) Inverter 98 will receive the true signal and logically invert it to a false signal and provide a false signal for one input to AND gate 92. Since AND gate 92 will produce an output only when both inputs are true, a false signal indicating slave transmission at one input of AND gate 92 will effectively block conduction by AND gate 92. When no slave transmission is being received, inverter 98 will receive a false or low input and invert it to a high or a true. When AND gate 92 receives a true input from inverter 98, the signal received from inverter 94 will control its output. Thus, when the output of level converter 90 goes high or true, a false will be transmitted at the output of AND gate 92 to conductor 102. When the output of level converter 90 goes low or false, inverter 94 will produce a true input to AND gate 92 and its output at conductor 102 will be high or true. Thus, when slave transmission is being received, the output of AND gate 92 will be kept low or false irrespective of what output is being produced by level converter 90 and when no slave transmission is being received, the output of level converter 90 controls the output of AND gate 92. Therefore, a simultaneous master transmission and slave transmission is prevented while not interferring with normal master transmission.

Assuming that no slave transmission is being received, high and low outputs produced by level converter 90 appear at the base of transistor 100 through conductor 102. The signals on conductor 102 range from zero volts to positive 0.7 volts. Transistor 100 performs a switching function between off and saturated on so that when the signal at the base of transistor 100 is zero volts, transistor 100 is saturated and likewise when the signal at the base of transistor 100 is 0.7 volts, transistor 100 is off. Diode 104 is connected at its anode to the emitter of transistor 100 to provide an additional PN junction which aids by decoupling ground circuit 20 to prevent reverse breakdown in the forward transmission. Transistors 106 and 108 also operate between a saturated on state and an off state. As recognized by one skilled in the art, when transistor 100 is saturated on, transistors 106 and 108 will also be saturated on. As also recognized by one skilled in the art, resistors R1 through R5 provide current limiting and biasing functions. The three transistor stages, i.e. 100, 106 and 108, are necessary to modify the signal received from master controller 10 from a range of positive three to negative three volts to a signal in the range of from minus twelve volts to zero. The transmission line output is at the collector of transistor 108. R6 protects transistor 108 in the event of a short circuit at conductor 56 or forward reverse bus 54.

When transistor 108 is off, the current through resistor R6 will be approximately zero and the signal on conductor 56 will be pulled to zero by resistor R8 (see FIG. 3) diode 118 and transistor 120 (see FIG. 3) of ground circuit 20. When transistor 108 is turned on, transistor 120 (see FIG. 3) is off and conductor 56 is pulled to minus twelve volts. Thus, through a series of transistors which operate in the switching mode, between off and saturated on states, the signals received from master controller 10, which vary between positive three volts to negative three volts are transformed to voltage logic signals ranging from zero to minus twelve volts.

It is important to note that ground circuit 20 (which will be discussed in detail in conjunction with FIG. 3) is in the opposite state of transistor 108, that is, saturated on when transistor 108 is off and off when transistor 108 is saturated on. These opposite states reflect the fact that transistor 108 conducts when transmitter 12 is transmitting and transistor 120 conducts when receiver 14 is receiving, there being no condition when both of these operations should occur simultaneously.

The negative voltage signals produced by transistor 108 are fed through forward reverse bus 54 in a forward direction, that is from master controller to slave controller, to slave receiver 22. Since the voltage is negative, current actually flows from ground bus 66 through constant current diode 110, through the light emitting diode in photocoupler 112, through conductor 114, through diode 116 and through conductor 76 to slave transmitter 24 through relay 27 to forward reverse bus 54. In other words, forward transmission is associated with the flow of current in the closed circuit including master transmitter 12, the negative power supply, buses 54 and 66 and slave receiver 22, and with the potential of bus 54 being negative from the system ground. In response to this current, the light emitting diode in photocoupler 112 will emit light which biases the base of a photosensitive transistor. The photosensitive transistor will communicate digital pulses to slave controller 28 through conductors 86a, 86b and 86c by switching on when the light emitting diode is on or illuminated and switching off (nonconductive) when the light emitting diode is off.

Level converter 90 may be of any type commercially available, however, No. 75152 is preferred. Also, transistors 100, 106 and 108 may also be of any type commercially available. However, the preferred embodiment employs transistor 2N2221 for transistors 100 and 108 and employs transistor 1N2906 for transistor 106. Photocoupler 112 is preferably 6N139 due to its high transfer ratio, high collector voltage rating and operating speed.

Figure 3:
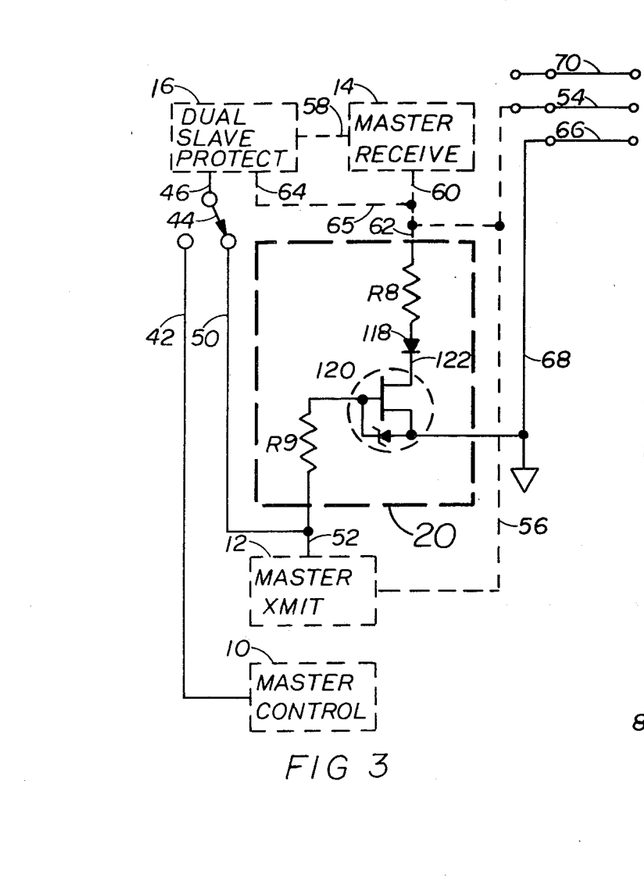
FIG. 3 is a schematic diagram of the ground circuit of FIG. 1.

Referring now to FIG. 3, ground circuit 20 is illustrated in schematic form. Ground circuit 20 comprises a resistor R8 connected between the anode of a diode 119, and conductor 62 which through conductor 65, connects to conductor 56 at the collector of transistor 108 of master receiver 14. The cathode of diode 119 is connected to the drain side of the VMOS transistor 120 through conductor 122. The gate side of transistor 120 is connected to master transmitter 12 through resistor R9 by conductor 52. The source side of transistor 120 is connected to ground bus 66 through conductor 68.

In operation transistor 120 receives its gate control voltage from the collector of transistor 100. The voltage impressed at the gate of VMOS transistor 120 will determine whether there is any current flow from drain to source, that is from conductor 122 to conductor 68. As pointed out in conjunction with FIG. 2, the collector voltage at transistor 100 is a positive 5 volts, or transistor 120 is conducting pulling the voltage on forward reverse bus 54 to zero, while the voltage at the collector of transistor 108 is zero volts or nonconducting. Conversely, the gate control voltage at the gate of transistor 120 is zero volts, or transistor 120 is nonconducting, when transistor 108 is conducting pulling the voltage on forward reverse bus 54 down to minus twelve volts. This complementary conduction occurs because the conduction of transistor 120 and 108 are both controlled by the potential of the collector of transistor 100, as may be seen by comparing the connections of conductor 52 in FIGS. 2 and 3. In summary transistor 120 operates in complimentary fashion with transistor 108 (i.e. when transistor 108 is conducting, transistor 120 is nonconducting and vice versa).

Diode 119 prevents transistor 120 from reverse breakdown when conductor 62 is switched to the −12 volt level. Transistor 120 is held in the conducting state during the complete reverse transmission operation. As will be explained in connection with FIG. 4, this assures that the voltage at the input of master receiver 14 (conductor 60) varies in accordance with the voltage which the signal current from slave transmitter 24 establishes across resistor R8 as it flows back to power supply 18 through the system ground. Even when transmitter 24 of FIG. 1 is in its non-conducting state (i.e., I=0), transistor 120 remains in its conducting state and holds forward reverse bus 54 at or near the potential of the system ground. Under the latter condition, however, the voltage at the input of master receiver 14 is approximately zero volts.

Transistor 120 may be of any type of switching transistor. However, a VMOS integrated circuit chip No. 2N6659 is preferred.

Figure 4:
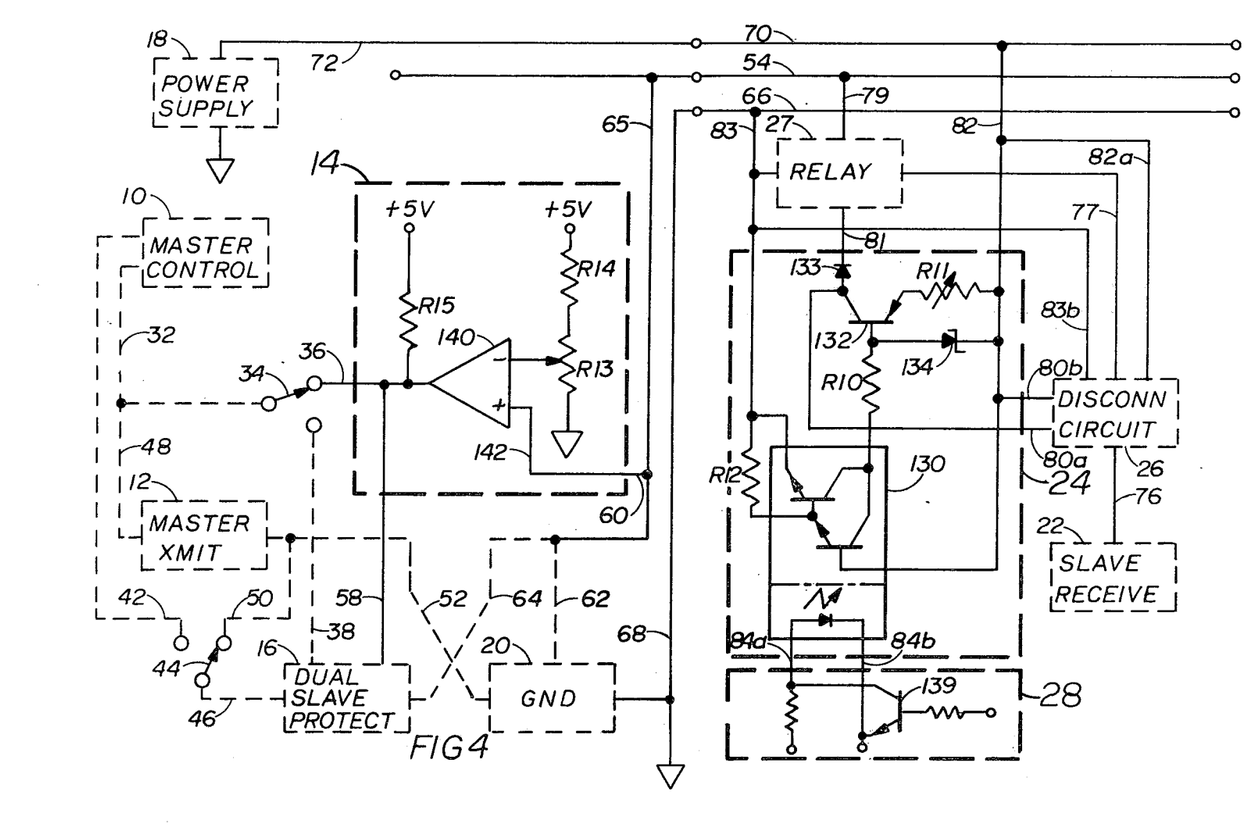
FIG. 4 is a schematic diagram of the slave transmitter and master receiver of FIG. 1.

Referring now to FIG. 4, slave transmitter 24 and master receiver 14 along with power bus 70, forward reverse bus 54 and ground bus 66 are illustrated in schematic form. Power supply 18, master transmitter 12, dual slave transmission protection circuit 16, ground circuit 20 and associated connections are illustrated for reference and although they are unnecessary for the description of the function of slave transmitter 24 and master receiver 14, they are illustrated to aid in an understanding of the operation of the circuits illustrated in schematic form.

Slave transmitter 24 is illustrated as having photocoupler 130 connected to power bus 70 through conductor 82. Photocoupler 130 is connected to the base of transistor 132 through resistor R10. Connected between the emitter of transistor 132 and conductor 80 to disconnect circuit 26 is a variable resistor R11. Connected between conductor 80 and the base of transistor 132 is voltage reference diode 134. Disconnect circuit 26 is connected to the collector of transistor 132 through conductor 80a. Photocoupler 130 is connected to slave controller 28 through conductors 84a and 84b. The collector of transistor 132 is connected through diode 133 through common contact of relay 27 by conductor 81. Illustrated in phantom form within slave controller 28 is transistor 139 and associated biasing resistors. Transistor 139 is illustrated for clarity in the description relating to the on and off states of the light emitting diode contained within photocoupler 130.

Master receiver 14 comprises a comparator 140 having its negative input connected through variable resistor R13 and resistor R14 to positive five volts. The positive input 142 of comparator 140 is connected to forward reverse bus 54 through conductor 60 and to ground circuit 20 through conductor 62, both conductors being connected to common conductor 65. Ground circuit 20 is connected to ground bus 66 through conductor 68 as has been previously described. The output of comparator 140 is connected to positive five volts through resistor R15 and provides an output to dual slave transmission protection circuit 16 through conductor 58, an output through conductor 36 to switch 34 which through conductor 48 controls the operation of AND gate 92 as described in conjunction with FIG. 2. When switch 34 connects conductor 48 to conductor 38 the output of comparator 140 is supplied to master transmitter 12 through dual slave transmission protection circuit 16.

It should be noted that in the preferred embodiment reverse transmission, that is from slave controller 28 to master controller 10, is by way of current pulses ranging from zero to 60 milliamps. The combination of transistor 132, reference diode 134 and resistor R11 operate as a constant current source. This constant current source is switched on and off by the phototransistor contained within photocoupler 130. By changing the bias at the base of transistor 132, the constant current may be switched on or off and travel through contacts of relay 27 through conductor 79 to forward reverse bus 54 to be received by comparator 140 through conductor 60. For the purposes of example we will assume that the output of comparator 140 at conductor 36 is connected to conductor 48 through switch 34.

The return path is through the power supply 18 through conductor 72 to power bus 70 through conductor 82 and through resistor R11 to the emitter of transistor 132. When the slave transmitter is transmitting a high state, that is 60 milliamps, transistor 139 of slave controller 28 is turned off, causing conductor 84a, connected to the positive side of the light emitting diode contained in photocoupler 130 to go high. In this condition the light emitting diode of photocoupler 130 is on and the photosensitive transistor contained within photocoupler 130 is also on, producing a low, that is 0 volts at the 130 and at R10. This causes transistor 132 to be biased on. While this is happening transistor 120 of ground circuit 20 is on and forward reverse bus 54 is at a voltage determined by the slave transmission current, 60 ma, and the value of resistor R8. The latter voltage is positive with respect to the system ground. (See FIG. 3.) Switching transistor 139 on turns off transistor 132 via photocoupler 130. When transistor 132 is turned off, resistor R8 in the ground circuit 20 pulls forward reverse bus 54 to 0 volts through conductor 62. The collector current of transistor 132 is established by zener diode 134, which acts as a voltage regulator with resistor R11 setting the current level. Resistor R11 is set for a current of 60 milliamps in the preferred embodiment although any size current pulse may be used. This current flows through the forward reverse bus 54 through R8 and transistor 120 of ground circuit 20 ground or common. The return path is through the positive 12 volt power supply 18 and through conductor 72 to power bus 70. Thus, reverse transmission occurs as a circuit having a current source characteristic (slave transmitter 24) generates pulses of current in the closed circuit including positive power supply 18, power bus 70, slave transmitter 24, forward reverse bus 54, master receiver 14, and ground circuit 20.

In the preferred embodiment, the 60 milliamp current develops a 2 volt drop across resistor R8 of ground circuit 20. Comparator 140 is set to have a voltage threshold of 1 volt in the preferred embodiment as determined by setting resistor R13. When the voltage at positive input 142 of comparator 140 becomes more than one volt positive from the system ground, the output switches from positive five volts to approximately 0.2 volts or ground which is fed through conductor 48 to inverter 98 of AND gate 92 (as described in conjunction with FIG. 2) and to master controller 10 through conductor 32, when switch 34 is connected to conductor 36. (In this connection it should be noted that voltages on bus 54 that are negative from the system ground cannot change the output voltage of comparator 140 since these tend to drive the latter voltage in the same direction as the voltage that is applied to comparator 140 by adjustable resistor R13.) The output of comparator 140 may be inverted and converted to logic levels which may be received by master controller 10 through an amplifier similar to level converter 90 of FIG. 2. Thus, reception of slave transmission occurs in master receiver 14 as the above-described pulses of current produce corresponding pulsations in the voltage that comparator 140 applies to master controller 10 through conductor 32. The present invention prefers comparator No. 75150, which is commercially available, to change the logic levels produced by comparator 140 to the range accepted by master controller 10.

Photocoupler 130 may be of any type commercially available. However, photocouplers 6N139 is preferred. Transistor 139 may also be of any type commercially available, however No. 2N2221 is preferred and transistor 132 is preferably 2N2906. Zener diode 134, or voltage regulator may also be of any type commercially available; however, No. LM311 is preferred.

Figure 5:
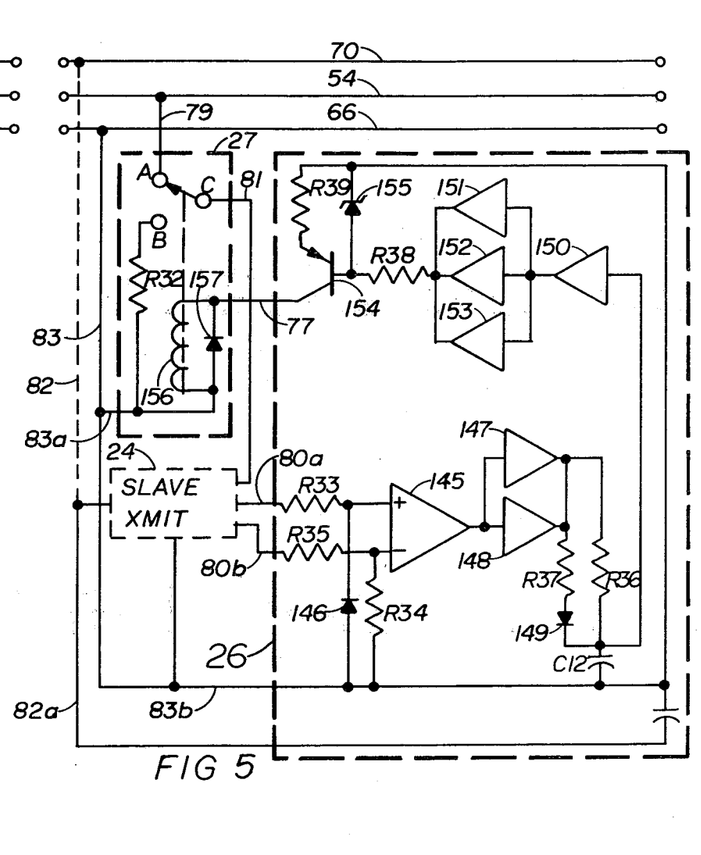
FIG. 5 is a partial schematic partial block diagram illustrating the faulty slave controller protection circuit of FIG. 1.

Referring now to FIG. 5, disconnect circuit 26 is illustrated as connected through conductor 77 to electromechanical relay 27 having an A contact and a B contact associated with mechanical switch fixed at contact C. The A contact, which is connected to the C contact during normal operation, is connected to forward reverse bus 54 through conductor 79. The B contact which is connected to the C contact only during failure of the slave controller is connected through resistor R32 to conductor 83 which is connected to ground bus 66. The C contact of relay 27 is connected to the slave transmitter 24 through conductor 81. Slave transmitter 24 is connected to resistor R33 of disconnect circuit 26 through conductor 80a. Resistor R33 is connected to the positive input of differential amplifier 145 and to the cathode of diode 146. The anode of diode 146 is connected to ground bus 66 through conductor 83b.

The negative input to differential amplifier 145 is connected to ground bus 66 through resistor R34 which is connected to conductor 83b, and to power bus 70 through resistor R35. The output of differential amplifier 145 is bifurcated and fed through inverters 147 and 148. The output of inverters 147 and 148 are joined and again bifurcated through the parallel combination of resistor R36 and the serial combination of R37 and diode 149. Resistor R37 is connected to the anode of diode 149 and resistor R36 is connected to its cathode. The cathode of diode 149 is connected to the input of inverter 150 and to capacitor C12 which is connected ground bus 66 through conductor 83b. The output of inverter 150 is fed through the parallel combination of inverters 151, 152 and 153 to resistor R38. Resistor R38 is connected to the base of transistor 154 and to the anode of zener diode 155. The cathode of the zener diode 155 is connected to ground bus 66 through conductor 83b. The emitter of transistor 154 is connected through resistor R39 the cathode of zener diode 155. The collector of transistor 154 is connected to ground bus 66 through the parallel combination of electromagnetic coil 156 of electromechanical relay 27 and diode 157, the anode of diode 157 being connected to ground bus 66 through conductor 83a and the cathode being connected to the collector of transistor 154.

During normal slave transmitter operation, transistor 132 (see FIG. 4) turns on and off up to as many as 10 times per character in the transmission of information to master controller 10. During the "on" (information conveying) state, transistor 132 drives bus 54 to its high state, i.e., renders bus 54 positive from the system ground, through connector 81 and relay 27. At the same time, this positive voltage is applied to the (+) input of amplifier 145, through conductor 80a, causing the output of differential amplifier 145 to saturate in the high direction. This causes the output of the paralleled CMOS inverters 147 and 148 to switch low which actuates the timing circuit comprising C12, R36, R37 and diode 149. In practice, when inverters 147 and 148 switch low, capacitor C12 begins to discharge through resistor R36. As transistor 132 turns off, the output of inverters 147 and 148 to switch high and capacitor C12 is quickly charged high through resistor R37. This effectively resets the timing circuit having an RC time constant determined by C12 and R36. Although the time out period, that is the length of the time constant, begins each time transistor 132 is on, it is constantly being reset with transistor 132 off. Thus, the electromagnetic coil 156 of relay 27 is not actuated to disconnect slave transmitter 24 from bus 54 unless transistor 132 remains on and thereby applies a continuous high to bus 54.

During failure of slave controller communication transmission, the voltage across capacitor C12 is sensed by the CMOS inverter 150 and when the voltage discharges to approximately 50% of the voltage on power bus 70, the output of inverter 150 switches high. This causes the output of the paralleled CMOS inverters 151, 152 and 153 to switch low, causing transistor 154 to conduct current through R39. This current is limited to a value to drive the electromagnetic coil 156 even though the voltage supplied by power bus 70 may vary. When relay 27 is energized, the current flow through transistor 132 is taken off the forward reverse bus 54 and channeled to ground bus 66 through resistor R32 when contact is made between contact B and contact C of relay 27. R32 limits the current to one milliamp which maintains a high voltage at the positive input of differential amplifier 145. Diode 144, of slave transmitter 24, prevents high signals from forward reverse bus 54 produced by other slave couplers from activating differential amplifier 145. Diode 146 clamps the input of differential amplifier 145 to ground when forward reverse bus 54 is driven negative during normal forward transmission from the slave coupler. Resistor R33 limits the clamp current to a low value (preferably 0.01 milliamps) to prevent unnecessary loading of the forward bus driver.

Figure 6:
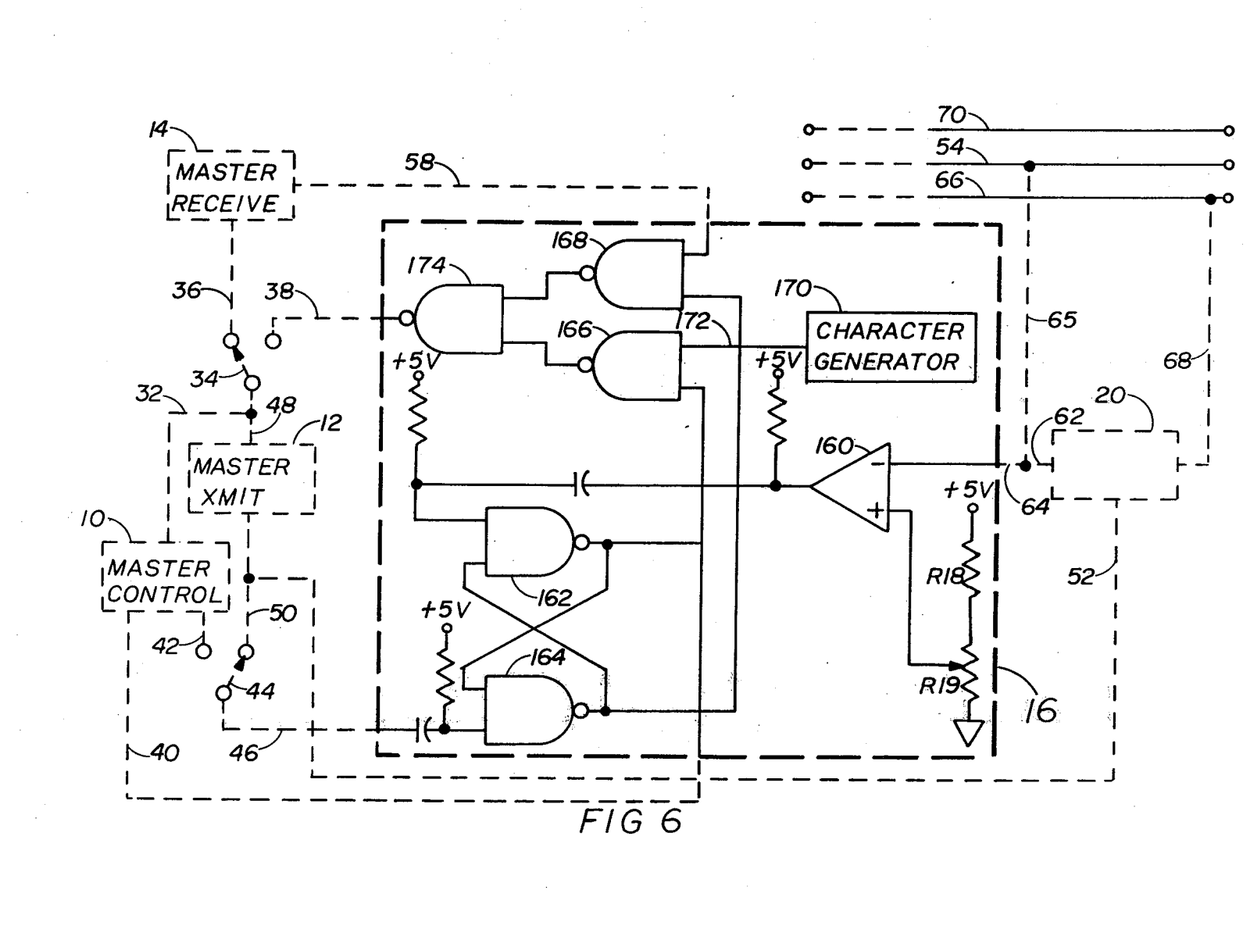
FIG. 6 is a logic diagram in block form of the simultaneous slave transmission circuit of FIG. 1.

Referring now to FIG. 6, dual slave transmission detection circuit is illustrated in logic block form. Dual slave transmission protection circuit comprises comparator 160 receiving its inverting (−) terminal input from forward reverse bus 54 through conductor 64 which is connected to conductor 65 and which also connects to ground circuit 20 through conductor 62. Comparator 160 receives its non-inverting (−) terminal input from a positive five volt power supply through resistor R18 and variable resistor R19. The output of comparator 160 provides one input for NAND gate 162 which together with NAND gate 164 comprises an RS flip-flop. The second input to NAND gate 162 is the output of NAND gate 164. NAND gate 164 receives its first input from master controller 10 through switch 44 when it connects conductor 46 to conductor 42 or from master transmitter 12 through switch 44 when it connects to conductor 50. NAND gate 164 receives its second input from the output of NAND gate 162. The output of NAND gate 162 provides one of the inputs for NAND gate 166 and the output of NAND gate 164 provides an input for NAND gate 168. NAND gate 166 receives its second input from character generator 170 through conductor 172. The second input to NAND gate 168 is from comparator 140 (FIG. 2) of master receiver 14 through conductor 58. The outputs of NAND gates 166 and 168 comprise the inputs to NAND gate 174. NAND gate 174 provides an output through conductor 38 to switch 34. Switch 34 provides an input to master transmitter 12 and to master controller 10 through conductors 48 and 32, respectively.

Dual slave transmission protection circuit 16 detects multiple simultaneous slave transmission and blocks conveyance of this information to master controller 10. When communications are received from only one slave controller the input to NAND gate 168 received from master receiver 14 through conductor 58 will control the output at conductor 38. When only one slave is transmitting, the signal received at switch 34 will be identical whether connected to conductor 36 or 38. When simultaneous slave transmission occurs the current on forward reverse bus 54 increases, that is the currents are summed from each slave transmitter up to the limits of the supply voltage and line resistance, and dual slave transmission protection circuit 16 is activated. The increased current level is detected by comparator 160 and one of two actions may be taken to inform the master controller 10. First, a special fault character is generated and supplied to master controller 10 through conductor 32 or second, conductor 40, the master clear to send line, is switched to not clear and a signal is received by NAND gate 166 through conductor 42. The first option may be selected by connecting switch 34 between conductor 48 and 38 and the connecting switch 44 to connect conductors 50 and 46. The second option is selected when switch 34 connects conductor 36 and 48 and switch 44 connects conductor 42 and 46.

Operation of dual slave transmission protection circuit 16 will be discussed assuming that there are 60 slave controllers distributed over a five thousand foot line. Under these conditions simultaneous slave transmission will result in an increase of inverse current level from 60 to 120 milliamps. This results in an increase of voltage drop across resistor R8 of ground circuit 20 (see FIG. 3) from two to four volts. This causes comparator 160 to switch since its threshold is preferably set at three volts by adjusting resistor R19. The output of comparator 160 goes from high, preferably five volts, to low, preferably zero volts. Thus, one input to NAND gate 162 will be low or false. When one input is false, it does not matter what the second input is. The output will be true (high). Thus, one input in NAND gate 166 will be true and one input to NAND gate 164 will also be true. NAND gate 164 will also receive a true through conductor 46 and thus its output will be false or low and one of the inputs to NAND gate 168 will also be false. With one input to NAND gate 168 false, its output will always be true regardless of the input received from comparator 140 of master receiver 14 through conductor 58. Since one input to NAND gate 166 is true, whatever input NAND gate 166 receives from character generator 170 through conductor 172 will be inverted and control the output of NAND gate 166. The outputs of NAND gates 166 and 168 comprise the two inputs to NAND gate 174 and since the output of NAND gate 168 is being held at true, the output from NAND gate 166 will control the output of NAND gate 174. When the output of NAND gate 166 is true, that is the output of character generator 170 is false, the output of NAND gate 174 will be false. Likewise, when the output of NAND gate 166 is true, that is the output of character generator 170 true, the output of NAND gate 174 will be true. Thus, when two slave controllers are transmitting at the same time, master controller 10 receives the output of character generator 170 through conductor 32.

When option 2 is selected, that is switch 34 connects conductor 36 to conductor 48 and switch 44 connects conductor 46 to conductor 42, a clear to send or a not clear to send signal is sent directly to a master controller through conductor 40. In operation comparator 160 will again produce a low or zero volt signal to one of the inputs of NAND gate 162. NAND gate 162 will issue a true signal as one of the inputs to NAND gate 164 and to master controller 10 through conductor 40. This true signal indicates that it is not clear to send messages to the slave controller that has been selected since two slave controllers are responding, that is, each is receiving the message desired to be sent to only one slave controller.

Under normal operating conditions under option 1 comparator 160 will issue as its output a true signal, that is only one slave controller is transmitting a message to the master controller. A true signal at the input of NAND gate 162 from comparator 160 will be combined with a true input from the output of NAND gate 164. This will produce a false output at NAND gate 162. A false output from NAND gate 162 will supply a false input to NAND gate 164 which will maintain its output as true. As described previously, the output of NAND gate 162 comprises one input to NAND gate 166 and the output of NAND gate 164 comprises one input to NAND gate 168. One input to NAND gate 166 will be the false output of NAND gate 162 and will effectively block transmission of the output of character generator 170 by maintaining the output of NAND gate 166 as true. By maintaining one input to NAND gate 168 as true, that is the output of NAND gate 164, the second input to NAND gate 168, the output of comparator 140 of master controller 10. Since the two inputs to NAND gate 174 are the outputs of NAND gate 166 and NAND gate 168, the information transmitted through conductor 38 will be determined by their output. The output of NAND gate 166 will be constantly true. Therefore, the output of NAND gate 168 will control the output at conductor 38. Thus, when comparator 140 issues a true signal, it will be inverted by NAND gate 168 since its other input is true and a false signal will be used as the second input to NAND gate 174. A false input from the output of NAND gate 168 will produce a true output at conductor 38. Likewise, a false output from comparator 140 will produce a false output at conductor 38 since a false output from comparator 140 will be inverted to a true output from NAND gate 168. A true input to NAND gate 174 from the output of NAND gate 168 will appear as a false output at conductor 38.

Under normal conditions for option 2, the comparator 160 produces a true output which will be received by NAND gate 162. NAND gate 162 will also receive a true input from NAND gate 164. Thus, the output of NAND gate 162 will be false. The false output from NAND gate 162 will provide one of the inputs to NAND gate 164 and maintain its output as a true. The false output from NAND gate 162 will be fed to master controller 10 through conductor 40. This condition, clear to send, will be maintained until two slave controllers transmit information to master controller 10 simultaneously. At this point, transmission will be blocked by the master controller through AND gate 92 as described in conjunction with FIG. 2 until master controller 10 issues or resets a clear to send signal and permits communication with slave controllers other than those identified by the previous transmission.

The foregoing preferred embodiment illustrates a method and apparatus for a communication system between a master controller and one or more slave controllers. It has illustrated a unique communication system whereby only three control wires are needed to connect a master controller with slave controllers instead of the traditional four wires. Also illustrated have been circuits to produce a unique first signal for forward transmission, that is from master controller to slave controller, consisting of negative voltage pulses and a unique second signal or reverse signal, that is from slave controller to master controller, consisting of constant current pulses at positive voltage. Also disclosed are circuits to protect against slave controller failures which lock the slave controller in a high transmitting position, which protect against dual slave transmission and which prevent simultaneous master and slave transmissions.

In light of the foregoing, many possible modifications can be made in the areas of band rate, communication speed, selection, circuit error identification means selection, slave controller number, selection and distribution, control terminal location and selection and master controller selection.

While the present invention has been illustrated by way of a preferred embodiment, the foregoing embodiment is by way of illustration only and the present invention should not be limited thereto, but only by the scope of the following claims.

What is claimed is:

1. In a master/slave communication system having a master controller with a receiver, a plurality of distributed slave controllers, each with a receiver, the improvement comprising:
   a power bus interconnecting said master controller and said plurality of slave controllers;
   a forward/reverse transmission bus interconnecting said master controller and said plurality of slave controllers;
   a ground bus interconnecting said master controller and said plurality of slave controllers;
   master transmitter means connected to said forward/reverse bus for transmitting digital data to a slave controller in accordance with the presence and absence of a first signal level in the circuit including the ground bus and the forward/reverse transmission bus; and
   slave transmitter means connected to said forward/reverse bus for transmitting digital data to the master controller in accordance with the presence and absence of a second signal level in the circuit including the power bus and the forward/reverse transmission bus.

2. The improvement according to claim 1 wherein said first signal level is a voltage produced by a first power source connected in circuit with the ground bus and the forward/reverse transmission bus.

3. The improvement according to claim 1 wherein said second signal level is a current produced by a second power source connected in circuit with the power bus and the forward/reverse transmission bus.

4. The improvement according to claim 1 wherein said first signal level is produced by source of voltage having a first polarity connected between the ground bus and the forward/reverse transmission bus.

5. The improvement according to claims 1 or 4 wherein said second signal level is produced by a source of voltage having a second polarity connected between the power bus and the forward/reverse transmission bus.

6. The improvement according to claim 1 wherein the receiver of each slave controller includes a photocoupling device for coupling that receiver to the associated slave controller.

7. The improvement according to claim 1 or 6 wherein each slave transmitter means includes a photocoupling device for coupling that slave transmitter means to the associated slave controller.

8. The improvement according to claim 1 wherein said master transmitter means includes blocking means for blocking transmission from said master transmitter means when the receiver of the master controller is receiving a transmission from one of the slave transmitter means.

9. The improvement according to claim 8 wherein said blocking means includes:
   first means in the receiver of the master controller for detecting signals from said slave transmitter means; and
   second means connected to said first means for preventing transmission by said master transmitter means when said first means detects signals from said slave transmitter means.

10. The improvement according to claim 9 wherein said second means is connected to said master controller to receive therefrom signals for transmission to a slave controller.

11. The improvement according to claim 1 wherein said slave transmitter means includes disconnect means for disconnecting said slave transmitter means from said forward/reverse bus when said slave transmitter means fails in a way that causes said second signal level to remain on said forward/reverse transmission bus.

12. The improvement according to claim 11 wherein said disconnect means includes:
   first means for detecting transmission by said slave transmitter means;
   second means connected to said first means for producing a clearing signal when said transmission remains at said second signal level; and
   clearing means responsive to said clearing signal to disconnect said slave transmitter means.

13. The improvement according to claim 12 wherein said first means includes a timing circuit which is activated by the presence of said second signal level.

14. The improvement according to claim 12 wherein said second means includes means for producing a current pulse.

15. The improvement according to claim 12 wherein said clearing means includes an electromechanical relay.

16. The improvement according to claim 15 wherein said electromechanical relay has a first state in which said slave transmitter means is connected to said forward/reverse bus and a second state in which said slave transmitter means is connected to said ground bus.

17. The improvement of claim 1 which additionally includes protection means for blocking reception of transmission from said slave transmitter means to the receiver of the master controller whenever more than one of said slave transmitter means is simultaneously transmitting digital data.

18. The improvement according to claim 17 wherein said protection means includes:
   first means for detecting transmission by slave controllers;
   second means connected to said first means for producing one signal whenever transmission is detected from one controller and another signal whenever transmission is detected from more than one controller simultaneously; and
   response means connected to said second means and to said master controller for producing an error signal to said master controller in response to said other signal.

19. The improvement according to claim 18 wherein said response means includes blocking means to prevent reception of said transmission from more than one controller simultaneously by said master controller.

20. The improvement according to claim 18 wherein said first means includes comparator means for producing a first signal when transmission is received by one controller and a second signal when transmission is received by more than one controller.

21. In a master/slave communication system including a master controller having a master receiver and a master transmitter, and a plurality of slave controllers having respective slave receivers and slave transmitters, the improvement comprising:
   a first power supply having a first polarity,
   a second power supply having a second polarity, a forward/reverse bus connecting the master transmitter to at least one slave receiver, and connecting at least one slave transmitter to the master receiver, a first bus connecting said first power supply in closed circuit relationship with the forward/reverse bus, the master transmitter and at least one slave receiver, a second bus connecting said second power supply in closed circuit relationship with the forward/reverse bus, the master receiver and at least one slave transmitter.

transmission between the master controller and the slave controllers being distinguished by differing polarities in the signals transmitted over said forward/reverse bus.

22. A master/slave communication system as set forth in claim 21 in which a circuit having a current regulating characteristic is included in each slave transmitter.

23. A master/slave communication system as set forth in claim 22 in which the master receiver includes first means responsive to the current in the forward/reverse bus for detecting simultaneous transmissions by two or more slave transmitters, and second means responsive to said first means for disabling transmission by the master transmitter when said simultaneous transmissions are detected.

24. A master/slave communication system as set forth in claim 21 in which the slave receivers and the slave transmitters are maintained in electrical isolation from the respective slave controllers.

25. A master/slave communication system as set forth in claim 24 in which the electrical isolation is maintained by respective optical coupling devices.

* * * * *